United States Patent [19]
Lydy et al.

[11] Patent Number: 5,142,851
[45] Date of Patent: Sep. 1, 1992

[54] POST-PROCESSING APPARATUS FOR LAWN MOWERS AND THE LIKE

[75] Inventors: Bruce S. Lydy, West Bend; Dennis R. Schueller, Belgium; Dennis J. Nickel, Saukville; James D. Rauwerdink, Franklin, all of Wis.

[73] Assignee: Garden Way Incorporated, Troy, N.Y.

[21] Appl. No.: 822,698

[22] Filed: Jan. 21, 1992

Related U.S. Application Data

[63] Continuation of Ser. No. 558,108, Jul. 24, 1990, abandoned.

[51] Int. Cl.⁵ .............................................. A01D 34/64
[52] U.S. Cl. ...................................... 56/13.4; 56/13.8; 56/17.5
[58] Field of Search ............... 56/13.4, 13.5, 13.6, 56/12.8, 13.3, 13.7, 13.8, 17.5

[56] References Cited

U.S. PATENT DOCUMENTS

| | | | |
|---|---|---|---|
| 2,843,991 | 7/1958 | Poehls | 56/13.3 X |
| 3,959,954 | 6/1976 | Halsten | 56/12.8 |
| 4,081,947 | 4/1978 | Szysmanis | 56/13.3 |
| 4,114,353 | 9/1978 | Ansbaugh et al. | 56/13.3 |
| 4,245,455 | 1/1981 | Martin | 56/17.5 X |
| 4,263,771 | 4/1981 | Iaboni et al. | 56/13.4 |
| 4,679,383 | 7/1987 | Ouintel | 56/13.4 |

*Primary Examiner*—Ramon S. Britts
*Assistant Examiner*—Roger J. Schoeppel
*Attorney, Agent, or Firm*—Hayes & Reinsmith

[57] ABSTRACT

A post-processor having a housing in communication with the discharge of a lawn mower. A cutting blade is disposed within the housing for rotation on a driven shaft for finely cutting the materials in the housing, and a discharge opening is formed in the housing above the cutting blade for discharging fine cut materials. An impeller is also disposed within the housing on the shaft for drawing materials past the cutting blades and forcing fine cut materials through the discharge opening. A baffle affixed to the housing adjacent the discharge opening disperses the stream of fine cut materials.

13 Claims, 7 Drawing Sheets

POST-PROCESSING APPARATUS FOR LAWN MOWERS AND THE LIKE

This is a continuation of copending application Ser. No. 07/558,108, filed on Jul. 24, 1990 now abandoned.

TECHNICAL FIELD

The present invention relates to mulching lawn mowers and more particularly to apparatus for post processing of materials including cut grass, leaves and like vegetation exiting a discharge in a lawn mower housing to effect improved mulching.

BACKGROUND OF THE INVENTION

Lawn mowers are well known gardening and landscaping devices used to cut grass; as used herein, the term lawn mower is intended to include a housing with generally vertically depending sides supported by a plurality of wheels. A prime mover such as a gas powered engine or electric motor is mounted to the housing in driving connection with one or more blades disposed in a processing chamber beneath the housing for cutting the grass. The lawn mower may comprise a handle for pushing the housing over the surface of the lawn (walk behind lawn mower) which may or may not have wheels driven by the prime mover, or the lawn mower may be of the self propelled type including mowers such as a tractor (riding lawn mower).

In a conventional lawn mower, a discharge opening is formed in a side wall of the housing, and the blades disposed in the processing chamber ingest and discharge significant amounts of air to carry suspended grass clippings through the discharge opening. A collection bag or other device may be fixed in communication with the discharge opening to collect the grass clippngs.

It is a primary object of the invention to provide an apparatus for attachment to a discharge opening in a mower housing which finely cuts materials including cut grass, leaves and like vegetation discharge from the mower, and thereafter evenly distributes the fine cut materials across a wide discharge path;

It is another object of the invention to provide an apparatus of the aforementioned type having a driven impeller and cutting blade wherein the impeller produces a high velocity air stream to draw materials discharged from the mower discharge past the cutting blade and thereafter forces the fine cut materials through a discharge opening in a housing of the apparatus;

It is a further object of the invention to provide an improved, low cost processor for attachment to the discharge opening in a mower housing to effect further reduction to a small size of discharged materials, which reduced materials are distributed over the lawn to provide nutrients and act as a natural mulch for the soil.

Other objects will be in part obvious and in part pointed out in more detail hereinafter.

A better understanding of the objects, advantages, features, properties and relations of the invention will be obtained from the following descriptions and accompanying drawings which set forth certain illustrative embodiments and are indicative of the various ways in which the principals of the invention are employed.

SUMMARY OF THE INVENTION

A post-processor constructed according to the present invention comprises, in its preferred embodiment, a housing having an entrance opening formed therein in communication with a mower discharge for receiving materials including cut grass, leaves and like vegetation into the housing; means for creating air movement in the housing directed outwardly of a housing discharge opening; and a cutting blade disposed within the housing for rotation on a driven shaft to finely cut materials in the housing.

In further accord with the invention, an impeller is disposed within the housing in axial alignment with but above the cutting blade for rotation on the same shaft to draw materials through the entrance opening and past the cutting blades, and to force the fine cut materials through the discharge opening located in the upper portion of the housing.

In still further accord with the invention, the housing comprises a top and bottom and depending side walls therebetween; and a baffle is fixed to the housing adjacent the discharge opening to deflect and disperse the stream of materials discharged from the discharge opening.

DESCRIPTION OF A PERFERRED EMBODIMENT

The post-processor of the present invention is particularly well suited for attachment to or for integral formation with a discharge opening in a lawn mower housing. The lawn may be of the walk behind or riding type as previously described, having one or more cutting blades disposed in the lawn mower processing chamber. The post-processor is configured to receive materials such as cut grass, leaves and like vegetation discharged from the lawn mower processing chamber, and so finely cut the materials prior to being discharged.

Figure 1:
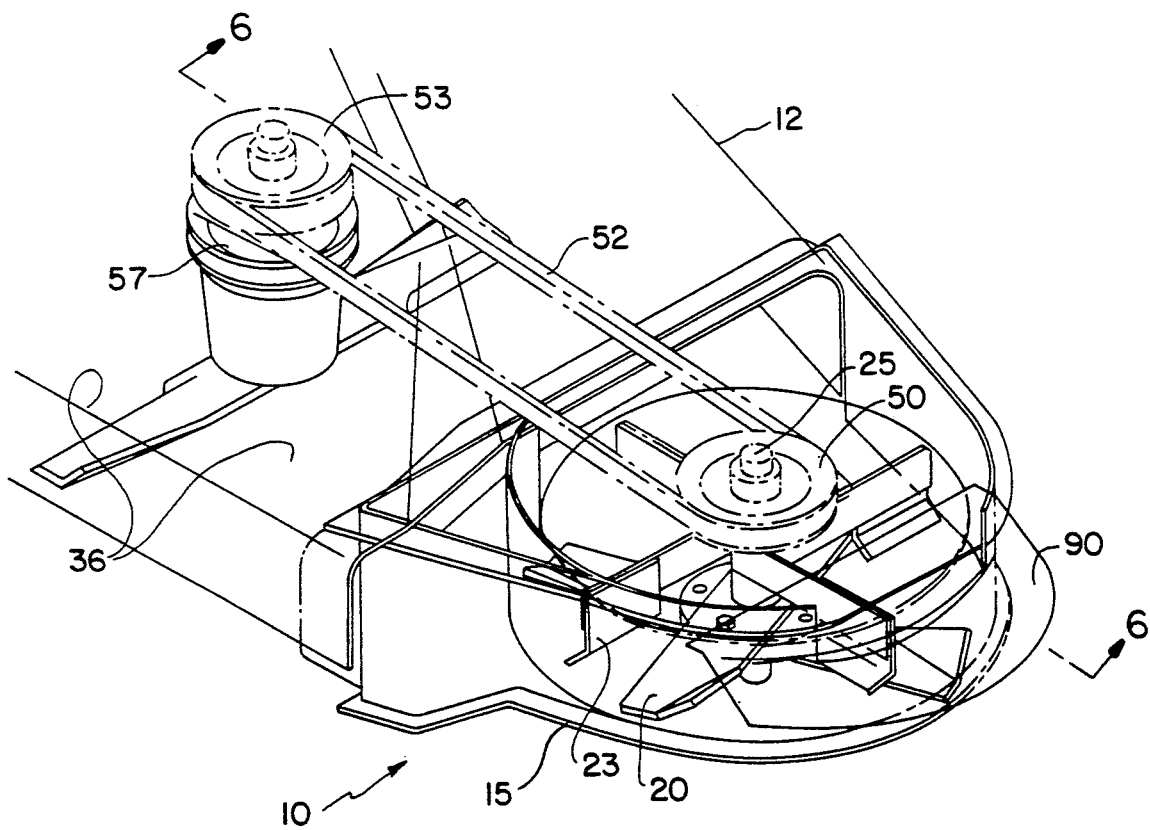
FIG. 1 is a perspective view of a post-processor constructed according to the present invention attached in communication with a lawn mower housing discharge.

Referring to FIG. 1, a post-processor 10 is shown mounted to the discharge of a lawn mower housing 12. The post-processor comprises a housing 15 having one or more cutting blades 20 and one or more impellers 23 disposed therein suitably driven for rotation on a vertical shaft 25.

Figure 2:
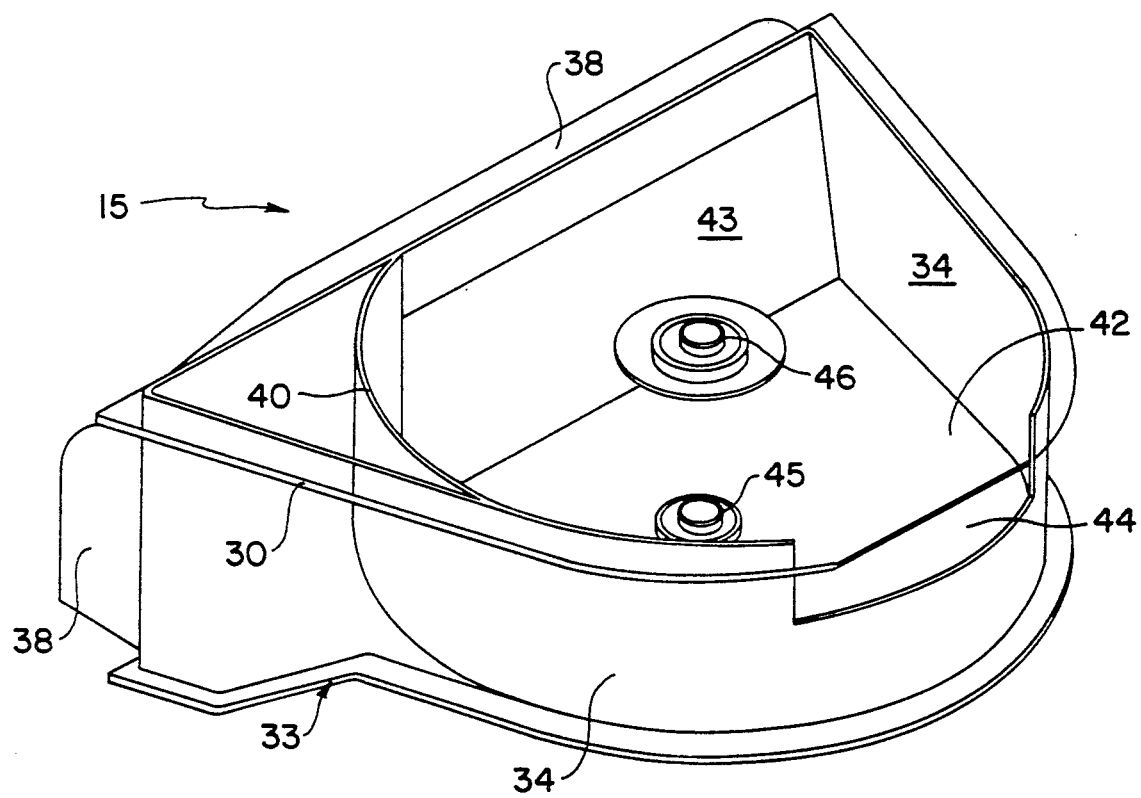
FIG. 2 is a perspective view of a housing of the post-processor of FIG. 1 suitable for accessory mounting to a suitable mower housing.
Figure 5:
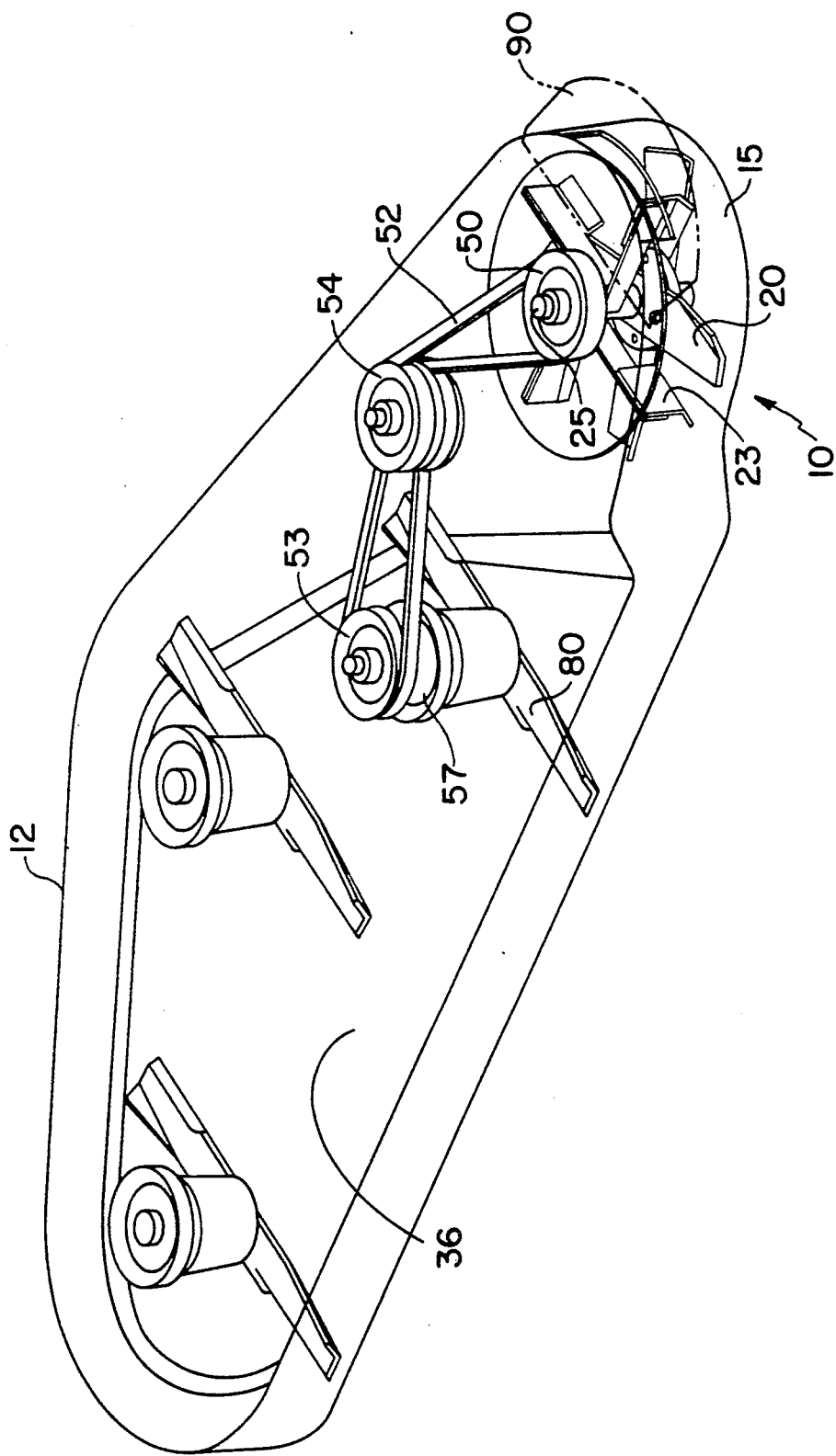
FIG. 5 is a top plan view of an alternative embodiment of the post-processor of FIG. 1 integrally formed with a lawn housing having multiple blades disposed in the mower processing chamber.
Figure 7:
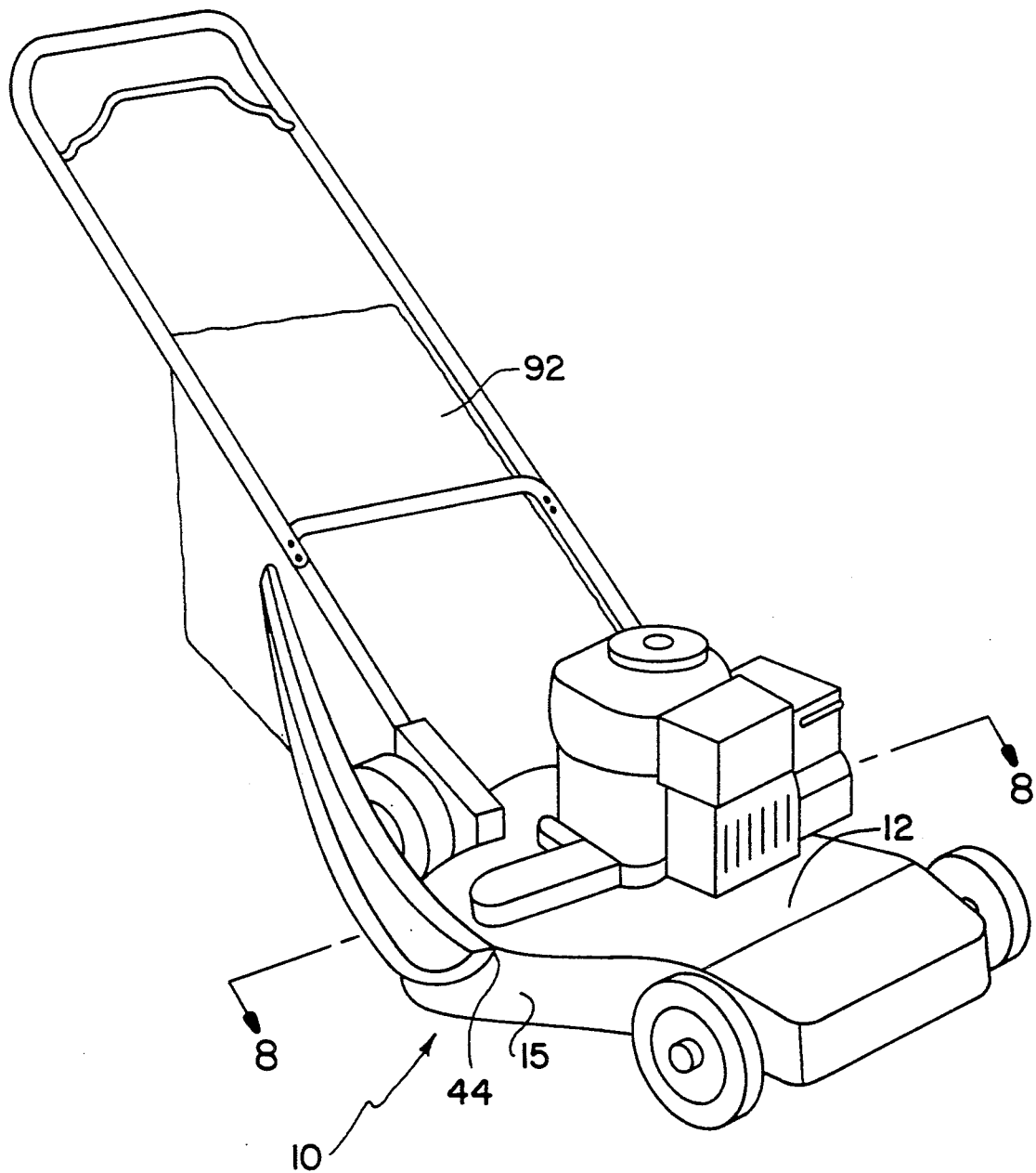
FIG. 7 is a perspective view of a second alternative embodiment of the post-processor of FIG. 1 integrally formed with a walk behind mower housing.

Referring to FIGS. 1 and 2, the housing 15 comprises a top member 30 in generally parallel relation to a bottom member 33, and vertically depending side walls 34. A side of the housing is formed in the shape of the discharge opening of the lawn mower housing 12, and has an extension 38 formed thereon to facilitate attachment of the post-processor housing 15 to the lawn mower housing 12. However, the post-processor will work equally as well if the housing 15 is integrally formed with the lawn mower housing discharge as shown in FIGS. 5 and 7.

Referring again to FIGS. 1 and 2, in one form of the invention a curved guide member 40 is affixed within the housing 15 to form a generally circular post-processing chamber 42 within the housing 15. An entrance opening 43 is formed in the housing side wall 34 on the side of the housing adjacent the lawn mower for receiving materials from the lawn mower processing chamber 36 into the post-processing chamber 42. A discharge opening 44 is also formed in the housing side wall 34 for discharging materials from the post-processing chamber 42. It will therefore be understood from the above description that the post-processing chamber 42 is completely enclosed by the housing top and bottom members 33, 34 and side walls 34, and that the entrance opening 43 and exit opening 44 provide access to the post-processing chamber for receiving and discharging materials to be processed therein. The entrance and exit openings are positioned for interposing the blade 20 therebetween so that materials must pass the blade for cutting prior to discharge from the post-processing chamber. In the preferred embodiment, the entrance opening is beneath the blade 20 and the discharge opening 44 is above the blade.

A pair of suitable support bearings 45, 46 are fixed in axial alignment to the top and the bottom of the housing 15 generally central of the post-processing chamber 42. The shaft 25 is received in the bearings 45, 46 for rotation about its axis which has a sheave 50 affixed thereto. A drive belt 52 interconnects the post-processor sheave 50 to a drive sheave 53 driven by the lawn prime mover of any suitable type (not shown) for rotating the shaft 25. The post-processor sheave 50 and drive sheave 53 may be directly interconnected by drive belt 52 as shown in FIG. 1, or an intermediate sheave 54 (FIG. 5) may be utilized for reverse rotation of the shaft 25. The drive sheave 53 may be mounted on a shaft 56 directly driven by the lawn mower prime mover as shown in FIG. 8, or a shaft having a subsequent sheave 57 for interconnection to the prime mover as shown in FIGS. 1 and 5.

Figure 3:
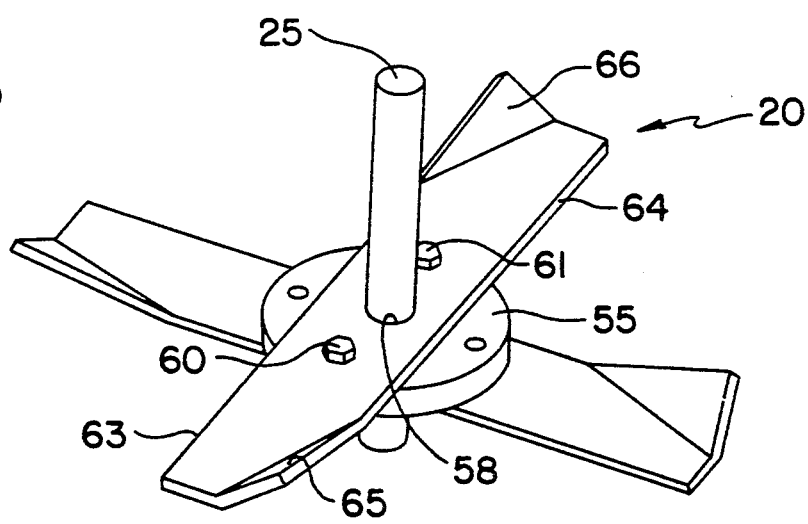
FIG. 3 is perspective view of cutting blades of the post-processor of FIG. 1.

The cutting blades 20 are mounted on the shaft by any suitable mounting means. Referring the FIGS. 1, 2 and 3, in the preferred embodiment a cylindrical collar 55 is formed on the shaft 25 for mounting the post-processor blades 20. Each blade 20 is generally rectangular in shape, and has an aperture 58 formed in the center of the blade for receiving the shaft 25. Each blade is clamped to the collar 55 by threaded fasteners 60, 61 received through apertures (not shown) in the blade and engaged with the threads of apertures (not shown) formed in the collar 55. Sharpened cutting edges 63, 64 are formed on the leading edges of the blade and the trailing edges of the blade 20 have upturned diagonal corners 65, 66 extending generally upwardly with respect to blade 20 so as to create air movement within the post-processing chamber 42 to draw material into the entrance opening 43 and past the blades 20.

Figure 4:
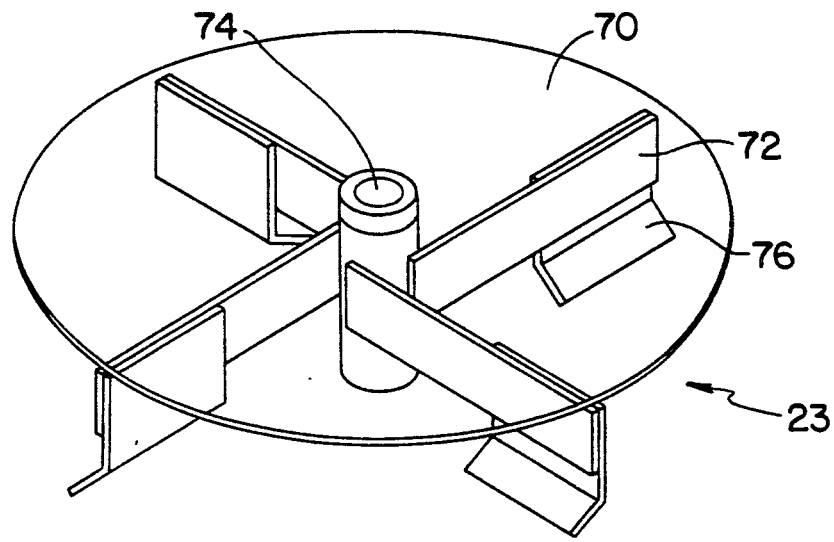
FIG. 4 is a perspective view of an impeller of the post-processor of FIG. 1.

Referring to FIGS. 1, 2 and 4, the impeller 23 comprises a disk 70 having a plurality of impeller blades 72 mounted thereon. An aperture 74 is formed in the center of the impeller and scoop shaped projections 76 depends downwardly from the end of each impeller blade 72. During operation of the post-processor 10, the rotating impeller 23 draws air and entrained materials past the cutting blades 20 and forces the materials through the discharge opening 44 thereby minimizing clogging of the post-processing chamber. The impeller 23 is provided with two or more blades 72; however, the blade 72 should be equally spaced around the impeller disk 70 for balanced rotation.

Figure 6:
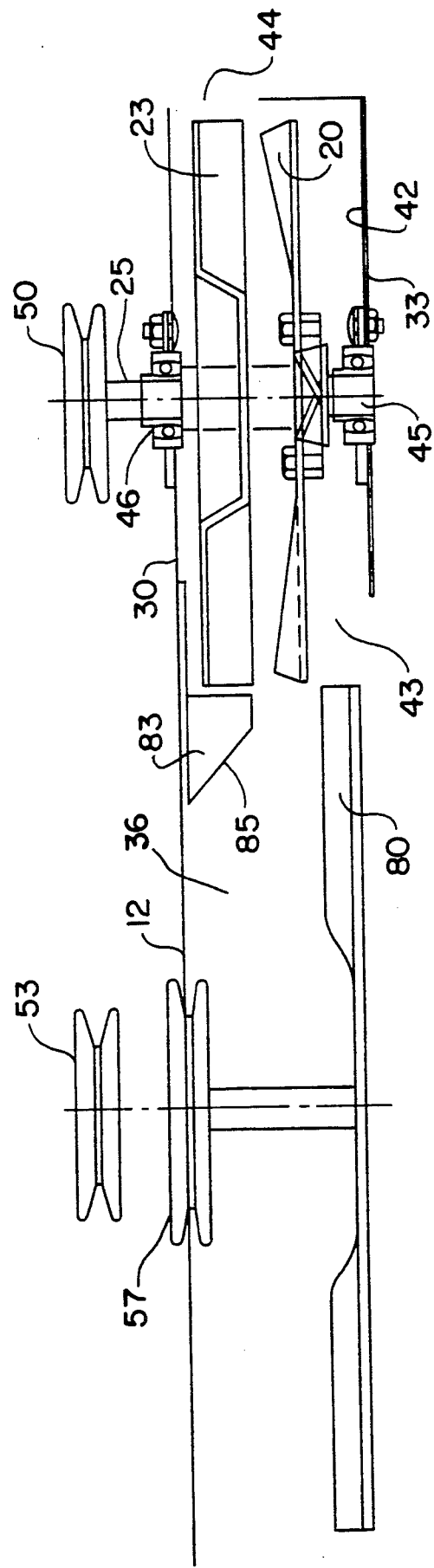
FIG. 6 is a cross-sectional view taken on line 6—6 of FIG. 1.
Figure 8:
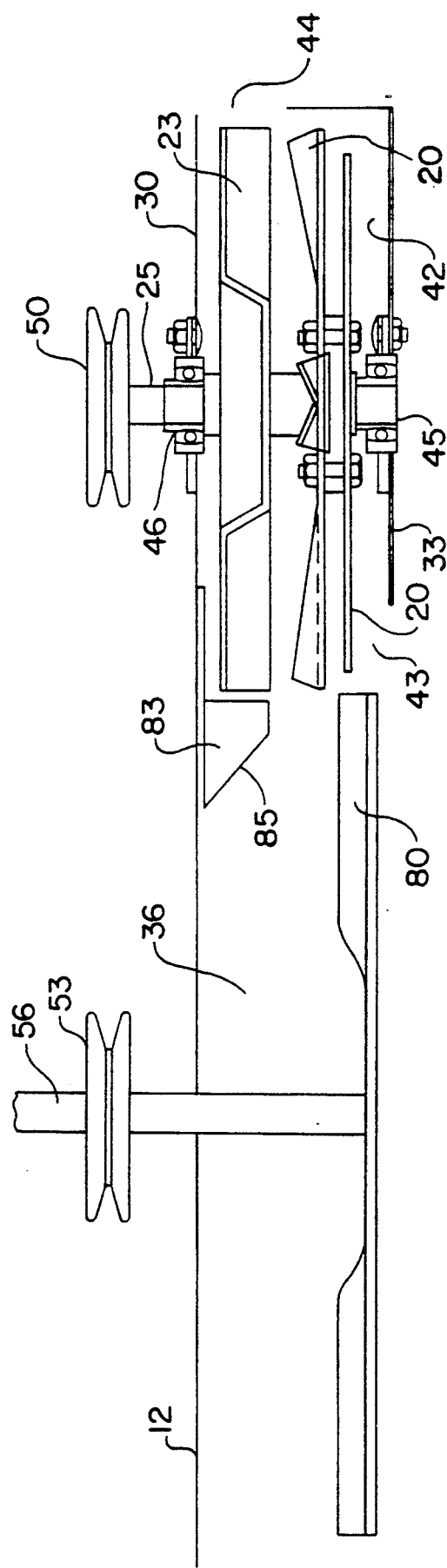
FIG. 8 is a cross-sectional view taken on line 8—8 of FIG. 7.

The post-processor cutting blade 20 may rotate in a horizontal plane above and adjacent to the horizontal plane of rotation of the lawn mower cutting blade 80 as shown in FIG. 6, or the horizontal plane of rotation of the cutting blades 20, 80 may overlap as shown in FIG. 8. The lawn mower cutting blade 80 is configured similar to the post-processing cutting blade 20 so that materials cut by the lawn mower cutting blade 80 are entrained in an air stream which exits the lawn mower processing chamber 36 through the post-processing chamber entrance opening 43 and exits through the post-processing chamber discharge opening 44, thereby lifting the materials past the post-processor cutting blades 20 for cutting.

In FIGS. 6 and 8, a deflector 83 is formed in the post-processor housing 15 adjacent the lawn mower processing chamber 36. The deflector 83 has an angled surface 85 to direct materials exiting the lawn mower processing chamber past the post-processor cutting blades 20.

Referring to FIGS. 1 and 5, a discharge baffle 90 may be fixed to the housing 15 adjacent the discharge opening 44, which baffle deflects materials discharged through the discharge opening 44 to evenly distribute and deflect the material downwardly over the lawn.

Referring to FIG. 7, the post-processor 10 may also be used with a collection bag 92 affixed in communication with the discharge opening 44 for collecting discharged materials.

By virtue of the above construction, reliable and efficient cutting of materials into small pieces is accomplished in the post-processor of the present invention. The aerodynamic and mechanical action of the rotating cutting blades and impeller effect the cutting of the materials and prevent clogging of the post-processing chamber. Additionally, the finely cut materials discharged from the post-processor are suitable for distribution over the lawn surface as a mulch while leaving the lawn with a clean neat appearance, or the finely cut materials may be collected for subsequent rapid decomposition in a compost pile.

Although the invention has been illustrated and described with respect to an exemparily embodiment thereof, it should be understood by those skilled in the art that various other changes, ommisions and additions may be made therein and thereto, without departing from the spirit and scope of the invention.

We claim:

1. Post processing apparatus for attachment to and use with a mower or the like have a housing and discharge opening, the post-processing apparatus cutting into small pieces discharged materials from the mower including cut grass, leaves and like vegetation exiting the mower discharge, comprising:
  a post-processing housing having fixed top and bottom continuous walls and side walls depending from said top wall; said housing being attachable to a mower housing;
  an entrance opening formed in said attachment housing for communication with the mower discharge to receive the discharged materials;
  a discharge opening formed in said attachment housing of the post processor adjacent the top wall for discharging materials;
  impeller means for creating air movement within said housing directed upwardly and outwardly of the discharge opening in said housing;
  a cutting blade independent of the impeller means disposed for rotation within said attachment housing between the entrance opening and the discharge opening, said blade cutting into small pieces the materials in said housing and
  means for rotating said cutting blade and said impeller means.

2. Apparatus according to claim 1 wherein said cutting blade is disposed above the entrance opening and below the discharge opening in said housing.

3. Apparatus according to claim 1 further comprising an impeller disposed for rotation within said housing above and in axial alignment with said cutting blade, said impeller creating air movement within said housing to draw materials through the entrance opening, past said cutting blade, and out the discharge opening to be distributed.

4. Apparatus according to claim 1 further comprising a baffle fixed to said housing adjacent the discharge opening to distribute and deflect downwardly the cut materials.

5. Apparatus according to claim 3 further comprising a shaft supported for rotation within said housing, said cutting blade and said impeller being supported on said shaft for rotation.

6. Apparatus according to claim 5 wherein said shaft extends through a top side of said housing and wherein said means for rotating comprises a sheave fixed to said vertical shaft extending through said housing.

7. Apparatus according to claim 1 wherein at least a portion of said air movement is accomplished by upturned diagonal corners on the trailing edges of said cutting blade.

8. An improved vegetation cutting and mulching apparatus comprising:
  a processor housing having ground engaging wheels rotatably affixed thereto for supporting said housing for movement;
  at least one cutting blade disposed within said housing for rotational engagement with the vegetation;
  drive means for rotatably driving said cutting blade;
  a post-processor housing mounted in side by side communication with said processor housing, said post-processor housing having fixed closed top and bottom walls and depending side walls;
  a post-processor cutting blade disposed within said post-processor housing for rotation;
  means for rotating said post-processor blade for further cutting of the vegetation; and
  means independent of the post-processor cutting means for creating an air movement within said post-processor housing directed outwardly of the discharge in said post-processor housing.

9. Apparatus according to claim 8 wherein the discharge is formed in said post-processor housing above said post-processor cutting blade.

10. Apparatus according to claim 8 further comprising an impeller disposed above and in axial alignment with said post-processor cutting blade, said impeller creating air movement within said post-processor housing directed outwardly of the discharge in said post-processor housing.

11. Apparatus according to claim 10 further comprising a shaft supported for rotation within said post-processor housing, said post-processor cutting blade and said impeller being supported on said shaft for rotation.

12. Apparatus according to claim 11 wherein said means for rotating comprises said shaft driven by said drive means.

13. Apparatus according to claim 8 wherein at least a portion of said air movement is created by upturned corners on said cutting blade and said post-processor cutting blade.

* * * * *

UNITED STATES PATENT AND TRADEMARK OFFICE
CERTIFICATE OF CORRECTION

PATENT NO. : 5,142,851
DATED : September 1, 1992
INVENTOR(S) : Bruce Scott Lydy, et. al.

It is certified that error appears in the above-indentified patent and that said Letters Patent is hereby corrected as shown below:

Column 2, line 56, wherein the word --mower-- should be added after the word "lawn".

Column 3, line 42, wherein the word --mower-- should be added after the word "mower".

Signed and Sealed this

Nineteenth Day of October, 1993

Attest:

BRUCE LEHMAN

Attesting Officer
Commissioner of Patents and Trademarks